(12) United States Patent
Takahashi et al.

(10) Patent No.: US 11,994,053 B2
(45) Date of Patent: May 28, 2024

(54) ELECTRICALLY HEATING CONVERTER AND ELECTRICALLY HEATING SUPPORT

(71) Applicant: NGK Insulators, Ltd., Nagoya (JP)

(72) Inventors: Hironori Takahashi, Nagoya (JP); Naoki Okamoto, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 0 days.

(21) Appl. No.: 17/821,852

(22) Filed: Aug. 24, 2022

(65) Prior Publication Data

US 2022/0397049 A1 Dec. 15, 2022

Related U.S. Application Data

(63) Continuation of application No. PCT/JP2021/003787, filed on Feb. 2, 2021.

(30) Foreign Application Priority Data

Mar. 5, 2020 (JP) .................................. 2020-038179

(51) Int. Cl.
 *F01N 3/28* (2006.01)
 *F01N 3/20* (2006.01)

(52) U.S. Cl.
 CPC .......... *F01N 3/2026* (2013.01); *F01N 3/2828* (2013.01); *F01N 2240/16* (2013.01); *F01N 2330/06* (2013.01)

(58) Field of Classification Search
 CPC ..... F01N 3/2026; F01N 3/2828; F01N 3/2871
 See application file for complete search history.

(56) References Cited

U.S. PATENT DOCUMENTS 5,744,104 A    4/1998   Sakurai et al.
8,765,068 B2 *   7/2014   Ishihara .................. H05B 3/12
                                                             422/174

(Continued)

FOREIGN PATENT DOCUMENTS

CN      110552760 A    12/2019
JP    2014-208994 A    11/2014

(Continued)

OTHER PUBLICATIONS

International Search Report and Written Opinion (Application No. PCT/JP2021/003787) dated Apr. 6, 2021 (with English translation).

(Continued)

*Primary Examiner* — Jonathan R Matthias
(74) *Attorney, Agent, or Firm* — BURR PATENT LAW, PLLC

(57) ABSTRACT

An electrically heating converter includes: a pillar shaped honeycomb structure made of conductive ceramics, including: an outer peripheral wall; and a partition wall disposed on an inner side of the outer peripheral wall, the partition wall defining a plurality of cells, each of the cells penetrating from one end face to other end face to form a flow path; metal electrodes; conductive connecting portions arranged on a surface of the pillar shaped honeycomb structure; and a pressing member configured to press the metal electrodes against the conductive connecting portions, so that the metal electrodes are electrically connected to the pillar shaped honeycomb structure. Each of the conductive connecting portions has an electrical resistivity lower than that of the pillar shaped honeycomb structure.

16 Claims, 8 Drawing Sheets

(56) References Cited

U.S. PATENT DOCUMENTS

| | | | |
|---|---|---|---|
| 2013/0036719 A1* | 2/2013 | Noguchi | C04B 41/52 |
| | | | 55/523 |
| 2014/0127085 A1 | 5/2014 | Omiya et al. | |
| 2014/0290227 A1 | 10/2014 | Sugiura et al. | |
| 2014/0294691 A1* | 10/2014 | Kikuchi | B01D 46/2418 |
| | | | 29/874 |
| 2016/0243500 A1 | 8/2016 | Omiya et al. | |
| 2016/0271561 A1 | 9/2016 | Nakayama | |
| 2018/0280872 A1* | 10/2018 | Noro | C04B 35/58092 |
| 2019/0368403 A1 | 12/2019 | Mori et al. | |

FOREIGN PATENT DOCUMENTS

| | | |
|---|---|---|
| JP | 2015-107452 A | 6/2015 |
| JP | 2016-153622 A | 8/2016 |
| JP | 2019-209245 A | 12/2019 |
| WO | 2013/008664 A1 | 1/2013 |

OTHER PUBLICATIONS

English translation of the International Preliminary Report on Patentability (Chapter I) dated Sep. 15, 2022 (Application No. PCT/JP2021/003787).
Chinese Office Action dated Jun. 14, 2023 (Application No. 202180013568.5).

* cited by examiner

ELECTRICALLY HEATING CONVERTER AND ELECTRICALLY HEATING SUPPORT

FIELD OF THE INVENTION

The present invention relates to an electrically heating converter and an electrically heating support.

BACKGROUND OF THE INVENTION

Recently, electrically heating catalysts (EHCs) have been proposed to improve exhaust gas purification performance immediately after engine starting. The EHCs are those for allowing a temperature of the catalyst to be increased to a catalyst activation temperature prior to the engine starting by connecting electrodes, for example, on a pillar shaped honeycomb structure made of conductive ceramics, and conducting a current to heat the honeycomb structure itself. The EHCs are desired to reduce temperature unevenness in the honeycomb structure to have a uniform temperature distribution, in order to obtain a sufficient catalytic effect.

To pass a current through the EHC, metal electrodes connected to external wirings must be electrically connected to a honeycomb structure of the EHC. A method of joining the metal electrodes to the honeycomb structure of EHC includes a method of chemically joining the metal electrodes to the surface of the honeycomb structure of EHC by heating or the like (Patent Literature 1), or a method of physically joining the metal electrodes to the surface of the honeycomb structure of EHC by pressing or the like (Patent Literature 2). Patent Literature 2 describes a method of canning an EHC having metal electrodes on its surface into a can body or the like via a mat material (holding material).

CITATION LIST

Patent Literatures

[Patent Literature 1] Japanese Patent Application Publication No. 2015-107452 A
[Patent Literature 2] Japanese Patent Application Publication No. 2014-208994 A

SUMMARY OF THE INVENTION

However, in the method of chemically joining the metal electrodes to the honeycomb structure of the EHC as described in Patent Literature 1, the metal electrodes are impeditive when the honeycomb structure of the EHC is coated with a catalyst or when the EHC is canned into the can body or the like, so that a work efficiency will decrease. Further, there is a problem that thermal stress is generated on the metal electrodes due to the heat applied when the catalyst coating is applied to the EHC honeycomb structure to which the metal electrodes are chemically joined, or the heat during use, so that connection stability of the metal electrodes is reduced.

Further, the method of physically joining the metal electrodes to the honeycomb structure of the EHC as described in Patent Literature 2 causes a problem that, when the honeycomb structure of the EHC is made of ceramics, the contact electrical resistance between the honeycomb structure of the EHC and the metal electrodes is larger. When the contact electrical resistance between the honeycomb structure of the EHC and the metal electrodes is larger, heat is generated to form an oxide film. The oxide film is often an insulator. If such an insulator is generated between the honeycomb structure of the EHC and the metal electrodes, the electrical connectivity may be reduced and the function as the EHC may be decreased.

The present invention has been made in view of the above circumstances. An object of the present invention is to provide an electrically heating converter and an electrically heating support, which can reduce the contact electrical resistance between the honeycomb structure and the metal electrodes, and satisfactorily suppress the generation of the oxide film.

The above problems are solved by the present invention as described below, and the present invention is specified as follows:

(1)
An electrically heating converter, comprising:
a pillar shaped honeycomb structure made of conductive ceramics, comprising: an outer peripheral wall; and a partition wall disposed on an inner side of the outer peripheral wall, the partition wall defining a plurality of cells, each of the cells penetrating from one end face to other end face to form a flow path;
metal electrodes;
conductive connecting portions arranged on a surface of the pillar shaped honeycomb structure; and
a pressing member configured to press the metal electrodes against the conductive connecting portions, so that the metal electrodes are electrically connected to the pillar shaped honeycomb structure,
wherein each of the conductive connecting portions has an electrical resistivity lower than that of the pillar shaped honeycomb structure.

(2)
An electrically heating support, comprising:
a pillar shaped honeycomb structure made of ceramics, comprising: an outer peripheral wall; and a partition wall disposed on an inner side of the outer peripheral wall, the partition wall defining a plurality of cells, each of the cells penetrating from one end face to other end face to form a flow path; and
conductive connecting portions arranged on a surface of the pillar shaped honeycomb structure,
wherein the conductive connecting portions comprise a material, the material having an electrical resistivity of $1.5 \times 10^0$ to $1.5 \times 10^4$ μΩcm, and containing one or more selected from the group consisting of Ni, Cr, Al and Si.

According to the present invention, it is possible to provide an electrically heating converter and an electrically heating support, which can reduce the contact electrical resistance between the honeycomb structure and the metal electrodes, and satisfactorily suppress the generation of the oxide film.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of one of ordinary skill in the art, without departing from the spirit of the present invention.

1. Electrically Heating Converter

Figure 1:
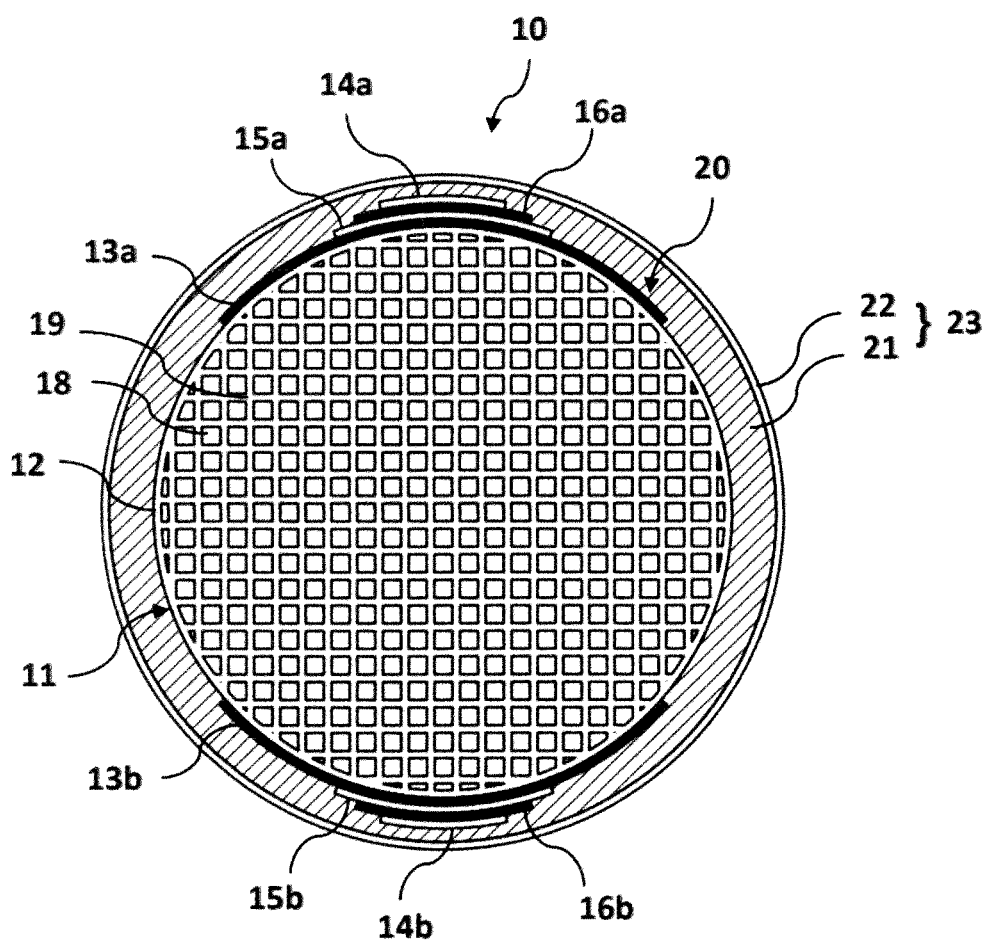
FIG. 1 is a schematic cross-sectional view for an electrically heating converter according to an embodiment of the present invention, which is perpendicular to an extending direction of cells of a pillar shaped honeycomb structure.
Figure 2:
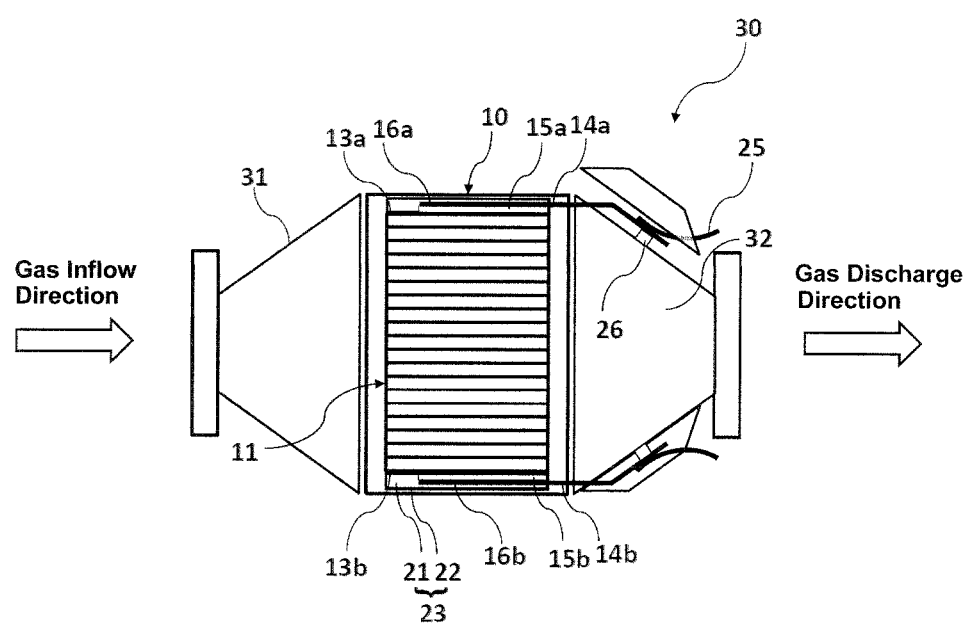
FIG. 2 is a schematic cross-sectional view for an electrically heating converter according to an embodiment of the present invention, which is parallel to an extending direction of cells of a pillar shaped honeycomb structure.

FIG. 1 is a schematic cross-sectional view for an electrically heating converter 10 according to an embodiment of the present invention, which is perpendicular to an extending direction of cells 18 of a pillar shaped honeycomb structure 11. FIG. 2 is a schematic cross-sectional view for the electrically heating converter 10 according to an embodiment of the present invention, which is parallel to an extending direction of the cells 18 of the pillar shaped honeycomb structure 11. The electrically heating converter 10 includes: the pillar shaped honeycomb structure 11 made of conductive ceramics; metal electrodes 14a, 14b; conductive connecting portions 15a, 15b provided on a surface of the pillar shaped honeycomb structure 11; and a pressing member 23.

(1-1. Honeycomb Structure)

Figure 3:
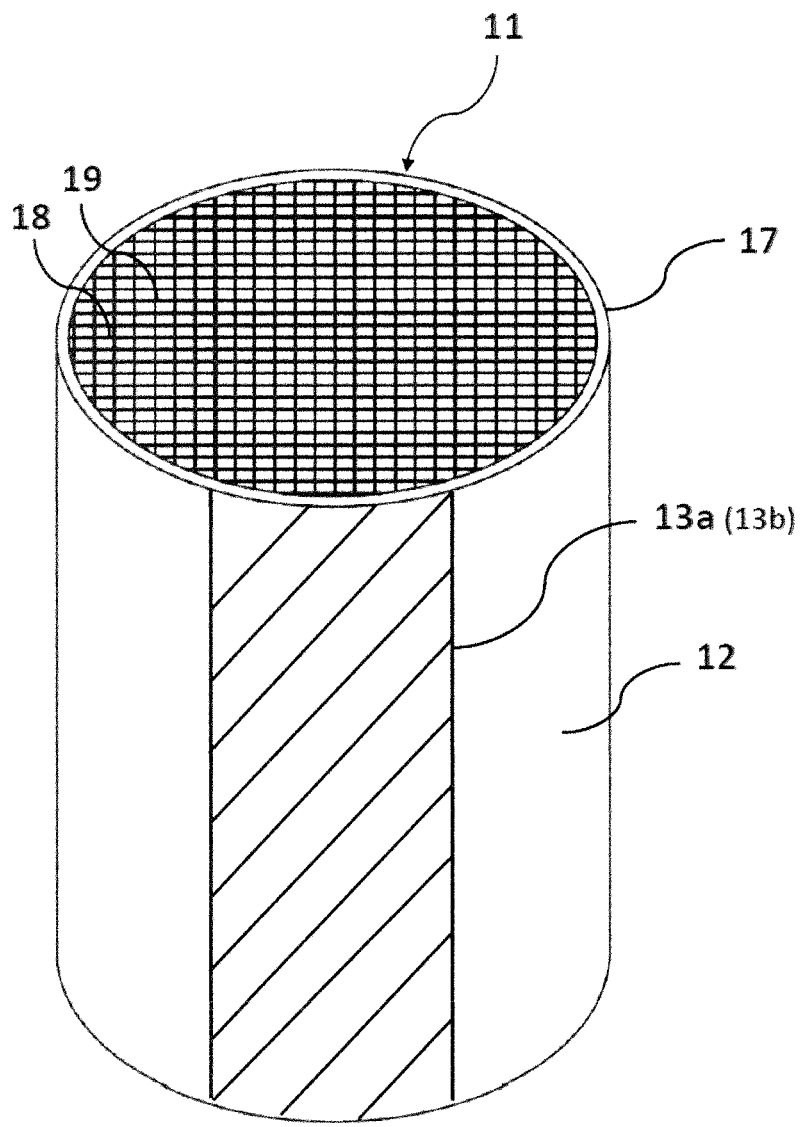
FIG. 3 is a schematic external view for a pillar shaped honeycomb structure according to an embodiment of the present invention.

FIG. 3 is a schematic external view for the pillar shaped honeycomb structure 11 according to an embodiment of the present invention. The pillar shaped honeycomb structure 11 includes a pillar shaped honeycomb portion 17 having: an outer peripheral wall 12; and a partition wall 19 which is disposed on an inner side of the outer peripheral wall 12 and defines a plurality of cells 18 penetrating from one end face to other end face to form flow paths. As shown in FIG. 3, the pillar shaped honeycomb structure 11 may include electrode layers 13a, 13b made of conductive ceramics, provided on the outer peripheral wall 12 of the pillar shaped honeycomb portion 17.

An outer shape of the pillar shaped honeycomb structure 11 is not particularly limited as long as it is pillar shaped. For example, the honeycomb structure can have a shape such as a pillar shape with circular end faces (cylindrical shape), a pillar shaped with oval end faces, and a pillar shape with polygonal (quadrangular, pentagonal, hexagonal, heptagonal, octagonal, etc.) end faces. The pillar shaped honeycomb structure 11 preferably has an area of end faces of from 2000 to 20000 $mm^2$, and more preferably from 5000 to 15000 $mm^2$, for the purpose of improving heat resistance (suppressing cracks entering the outer peripheral wall in a circumferential direction).

The pillar shaped honeycomb structure 11 is made of ceramics and has conductivity. Electrical resistivity of the ceramic is not particularly limited as long as the conductive pillar shaped honeycomb structure 11 can generate heat by Joule heat upon electrical conduction. The electrical resistivity is preferably from 0.1 to 200 Ωcm, and more preferably from 1 to 200 Ωcm, and even more preferably from 10 to 100 Ωcm. In the present invention, the electrical resistivity of the pillar shaped honeycomb structure 11 is a value measured at 400° C. by a four-terminal method.

A material of the pillar shaped honeycomb structure 11 can be selected from, but not limited to, oxide ceramics such as alumina, mullite, silicate glass, zirconia, and cordierite, and non-oxide ceramics such as silicon, silicon carbide, silicon nitride, and aluminum nitride. Further, a silicon carbide-metal silicon composite material, a silicon carbide/graphite composite material, a borosilicate glass-metal silicon composite material, or the like can also be used. Among them, from the viewpoint of compatibility of heat resistance and conductivity, the material of the honeycomb structure 11 preferably contains ceramics mainly based on a silicon-silicon carbide composite material or silicon carbide. The phrase "the material of the honeycomb structure 11 is mainly based on a silicon-silicon carbide composite material" means that the pillar shaped honeycomb structure 11 contains 90% by mass or more of the silicon-silicon carbide composite material (total mass) based on the entire honeycomb structure. Here, for the silicon-silicon carbide composite material, it contains silicon carbide particles as an aggregate and silicon as a bonding material for bonding the silicon carbide particles, and a plurality of silicon carbide particles are preferably bonded by silicon so as to form pores between the silicon carbide particles.

When the pillar shaped honeycomb structure 11 contains the silicon-silicon carbide composite material, a ratio of "mass of silicon as a bonding material" contained in the pillar shaped honeycomb structure 11 to the total of "mass of silicon carbide particles as an aggregate" contained in the pillar shaped honeycomb structure 11 and "mass of silicon as a bonding material" contained in the pillar shaped honeycomb structure 11 is preferably from 10 to 40% by mass, and more preferably from 15 to 35% by mass. When it is 10% by mass or more, the strength of the pillar shaped honeycomb structure 11 is sufficiently maintained. When it is 40% by mass or less, the shape is easily maintained during firing.

A shape of each cell in a cross section perpendicular to an extending direction of the cells 18 is not limited, but it is preferably a quadrangle, a hexagon, an octagon, or a combination thereof. Among these, the quadrangle and the hexagon are preferred. Such a cell shape can lead to a decreased pressure loss upon flowing of an exhaust gas through the pillar shaped honeycomb structure 11, resulting in improvement of purification performance of the catalyst. The quadrangle is particularly preferable in terms of easily achieving both structural strength and heating uniformity.

The partition wall 19 forming the cells 18 preferably has a thickness of from 0.1 to 0.3 mm, and more preferably from 0.15 to 0.25 mm. The thickness of the partition wall 19 of 0.1 mm or more can suppress a decrease in the strength of the honeycomb structure. The thickness of the partition wall 19 of 0.3 mm or less can suppress an increase in pressure loss upon flowing of an exhaust gas, when the honeycomb structure is used as a catalyst support and a catalyst is supported thereon. As used herein, the thickness of the partition wall 19 is defined as a length of a portion passing through the partition wall 19, among line segments connecting centers of gravity of the adjacent cells 18 in a cross section perpendicular to the extending direction of the cells 18.

The pillar shaped honeycomb structure 11 preferably has a cell density of from 40 to 150 cells/$cm^2$, and more preferably from 70 to 100 cells/$cm^2$, in a cross section perpendicular to a flow path direction of cells 18. The cell density in such a range can increase the purification performance of the catalyst while reducing the pressure loss upon flowing of an exhaust gas. The cell density of 40 cells/cm$^2$ or more can ensure a sufficient catalyst supporting area. The cell density of 150 cells/cm$^2$ or less can prevent a pressure loss upon flowing of an exhaust gas from being increased when the pillar shaped honeycomb structure 11 is used as a catalyst support and a catalyst is supported thereon. The cell density is a value obtained by dividing the number of cells by an area of one end face of the pillar shaped honeycomb structure 11 excluding the outer peripheral wall 12.

The provision of the outer peripheral wall 12 of the pillar shaped honeycomb structure 11 is useful in terms of ensuring the structural strength of the pillar shaped honeycomb structure 11 and preventing a fluid flowing through the cells 18 from leaking from the outer peripheral wall 12. More particularly, the thickness of the outer peripheral wall 12 is preferably 0.1 mm or more, and more preferably 0.15 mm or more, and even more preferably 0.2 mm or more. However, if the outer peripheral wall 12 is too thick, the strength becomes too high, so that a strength balance between the outer peripheral wall 12 and the partition wall 19 is lost to reduce thermal shock resistance. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in a cross section perpendicular to a cell extending direction.

The partition wall 19 can be porous. A porosity of the partition wall 19 is preferably from 35 to 60%, and more preferably from 35 to 45%. The porosity of 35% or more can lead to more easy suppression of deformation during firing. The porosity of 60% or less can allow the strength of the honeycomb structure to be sufficiently maintained. Further, the partition wall 19 may be dense as in the form of Si-impregnated SiC or the like. The word "dense" means that the porosity is 5% or less. The porosity is a value measured by a mercury porosimeter.

The partition wall 19 of the pillar shaped honeycomb structure 11 preferably has an average pore diameter of from 2 to 15 µm, and more preferably from 4 to 8 µm. The average pore diameter of 2 µm or more can prevent excessively high electric resistivity. The average pore diameter of 15 µm or less can prevent excessively low electric resistivity. The average pore diameter is a value measured by a mercury porosimeter.

(1-2. Electrode Layer)

As shown in FIG. 1, the electrode layers 13a, 13b may be arranged on the surface of the outer peripheral wall 12 of the pillar shaped honeycomb structure 11. The electrode layers 13a, 13b may be a pair of electrode layers 13a, 13b arranged so as to face each other across a central axis of the pillar shaped honeycomb structure 11. Further, the electrode layers 13a, 13b may not be provided.

The electrode layers 13a, 13b may be formed in a non-limiting region. In terms of enhancing uniform heat generation of the pillar shaped honeycomb structure 11, each of the electrode layers 13a, 13b is preferably provided so as to extend in the form of belt in the circumferential direction and the cell extending direction. More particularly, it is desirable that each of the electrode layers 13a, 13b extends over a length of 80% or more, and preferably 90% or more, and more preferably the full length, between both end faces of the pillar shaped honeycomb structure 11, from the viewpoint that a current easily spreads in an axial direction of each of the electrode layers 13a, 13b.

Each of the electrode layers 13a, 13b preferably has a thickness of from 0.01 to 5 mm, and more preferably from 0.01 to 3 mm. Such a range can allow uniform heat generation to be enhanced. The thickness of each of the electrode layers 13a, 13b of 0.01 mm or more can lead to appropriate control of electric resistance, resulting in more uniform heat generation. The thickness of 5 mm or less can reduce a risk of breakage of the electrode layers during canning. The thickness of each of the electrode layers 13a, 13b is defined as a thickness in a direction of a normal line to a tangential line at a measurement point on an outer surface of each of the electrode layers 13a, 13b when observing the point of each electrode layer to be subjected to thickness measurement in the cross section perpendicular to the cell extending direction.

Each of the electrode layers 13a, 13b may be made of a metal, conductive ceramics or a composite material of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), and metal compounds such as metal silicide such as tantalum silicide ($TaSi_2$) and chromium silicide ($CrSi_2$). Specific examples of the composite material of the metal and the conductive ceramics (cermet) include a composite material of metal silicon and silicon carbide, a composite material of metal silicide such as tantalum silicide and chromium silicide, metal silicon and silicon carbide, and further a composite material containing, in addition to one or more metals listed above, one or more insulating ceramics such as alumina, mullite, zirconia, cordierite, silicon nitride, and aluminum nitride, in terms of decreased thermal expansion. As the material of the electrode layers 13a, 13b, among the various metals and conductive ceramics as described above, a combination of a metal silicide such as tantalum silicide and chromium silicide with a composite material of metal silicon and silicon carbide is preferable, because it can be fired simultaneously with the pillar shaped honeycomb portion, which contributes to simplification of the producing steps.

(1-3. Conductive Connecting Portion)

Figure 4:
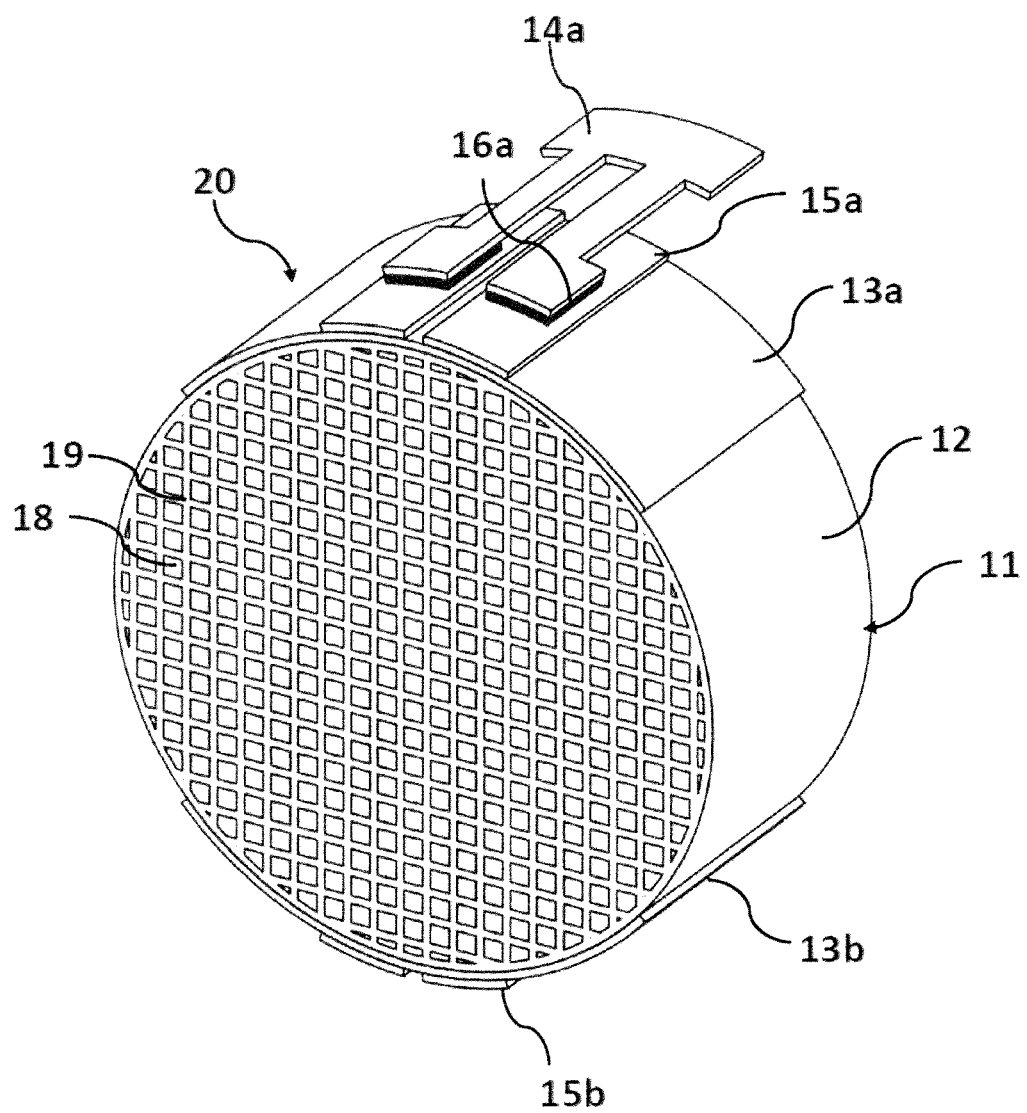
FIG. 4 is a schematic external view for a pillar shaped honeycomb structure, a conductive connecting portion, and a metal electrode according to an embodiment of the present invention.

FIG. 4 is a schematic external view of the pillar shaped honeycomb structure 11, the conductive connecting portions 15a, 15b, and the metal electrode 14a of the electrically heating converter 10 according to an embodiment of the present invention. The conductive connecting portions 15a, 15b are provided on the electrode layers 13a, 13b, respectively, of the pillar shaped honeycomb structure 11. When the pillar shaped honeycomb structure 11 does not have the electrode layers 13a, 13b, the conductive connecting portions 15a, 15b may be provided on the surface of the outer peripheral wall 12 of the pillar shaped honeycomb structure 11.

The electrical resistivity of each of the conductive connecting portions 15a, 15b is lower than that of the pillar shaped honeycomb structure 11. In the electrically heating converter 10 according to an embodiment of the present invention, the pillar shaped honeycomb structure 11 and the metal electrodes 14a, 14b are physically joined by a pressing member 23, which will be described below. That is, the pillar shaped honeycomb structure 11 and the metal electrodes 14a, 14b are not bonded by chemical bonding such as welding, brazing, and diffusion bonding, and are in contact with each other in a non-bonded state. Such physical joining causes a problem that the Schottky barrier increases the contact electrical resistance between the pillar shaped honeycomb structure 11 and the metal electrodes 14a, 14b, causing heat generation and forming an oxide film (insulator). On the other hand, according to the embodiment of the present invention, the conductive connecting portions 15a, 15b are provided between the pillar shaped honeycomb structure 11 and the metal electrodes 14a, 14b, and the electrical resistivity of each of the conductive connecting portions 15a, 15b is lower than that of the pillar shaped honeycomb structure 11. Therefore, it is believed that even if the pillar shaped honeycomb structure 11 and the metal electrodes 14a, 14b are physically joined, the Schottky barrier can be suppressed and the contact electrical resistance between the pillar shaped honeycomb structure 11 and the metal electrodes 14a, 14b can be reduced, thereby suppressing the heat generation. As a result, it is possible to suppress the formation of the oxide film (insulator) between the pillar shaped honeycomb structure 11 and the metal electrodes 14a, 14b, and to satisfactorily suppress the deterioration of the function as EHC. It should be noted that when the pillar shaped honeycomb structure 11 has the electrode layers 13a, 13b, the contact resistance of the conductive connecting portions 15a, 15b will be related to the electrode layers 13a, 13b, so that the electrical resistivity of each of the conductive connecting portions 15a, 15b should be lower than that of each of the electrode layers 13a, 13b. On the other hand, when the pillar shaped honeycomb structure 11 does not have the electrode layers 13a, 13b, the contact resistance of the conductive connecting portions 15a, 15b will be related to the pillar shaped honeycomb portion 17, so that the electrical resistivity of each of the conductive connecting portions 15a, 15b should be lower than that of the pillar shaped honeycomb portion 17.

The material of the conductive connecting portions 15a, 15b preferably contains one or more selected from the group consisting of Ni, Cr, Al and Si. Such a material improves the heat resistance of the conductive connection portions 15a, 15b, and also tends to form the conductive connecting portions 15a, 15b having the electrical resistivity lower than that of the pillar shaped honeycomb structure 11 made of conductive ceramics. The material of the conductive connecting portions 15a, 15b are more preferably CrB—Si, LaB$_6$—Si, TaSi$_2$, AlSi, NiCr, NiAl, NiCrAl, NiCrMo, NiCrAlY, CoCr, CoCrAl, CoNiCr, CoNiCrAlY, CuAlFe, FeCr, FeCrAl, FeCrAlY, CoCrNiW, CoCrWSi, or NiCrFe. Even more preferably, the material is CrB—Si, LaB$_6$—Si, TaSi$_2$, NiCr, NiCrAlY, or NiCrFe. Further, when the conductive connecting portions 15a, 15b are made of a metal, the contact area with the pillar shaped honeycomb structure 11 and the metal electrodes 14a, 14b is increased, so that the contact electrical resistance between the pillar shaped honeycomb structure 11 and each of the metal electrodes 14a, 14b can more satisfactorily be reduced.

From the viewpoint of suppressing the Schottky barrier as described above, it is preferable that for the material of the conductive connecting portions 15a, 15b, the content of the material exhibiting semiconductor characteristics is maintained below a certain amount. For the material of the conductive connecting portions 15a, 15b, the content of the material exhibiting semiconductor characteristics is preferably 80% by mass or less, and more preferably 70% by mass or less, and further preferably 65% by mass or less.

Non-limiting examples of the material exhibiting the semiconductor characteristics as described above include at least one selected from the group consisting of Si, Ge, ZnS, ZnSe, CdS, ZnO, CdTe, GaAs, InP, GaN, GaP, SiC, SiGe, and CuInSe$_2$.

The material of the conductive connecting portions 15a, 15b preferably has an electrical resistivity of $1.5 \times 10^0$ to $1.5 \times 10^4$ µΩcm. When the material of the conductive connecting portions 15a, 15b has the electrical resistivity of $1.5 \times 10^4$ µΩcm or less, the contact electrical resistance can be reduced and the heat generation can be suppressed. The material of the conductive connecting portions 15a, 15b more preferably has an electrical resistivity of $1.5 \times 10^0$ to $5.0 \times 10^3$ µΩcm.

The thickness of each of the conductive connecting portions 15a, 15b is preferably 0.1 to 500 µm. The thickness of each of the conductive connecting portions 15a, 15b of 0.1 µm or more can allow the contact electrical resistance between the pillar shaped honeycomb structure 11 and the metal electrodes 14a, 14b to be satisfactorily reduced. It should be noted that when the electrically heating converter 10 is used in an environment where vibration is intense, it is consumed by friction with the pressed metal electrodes 14a, 14b and the flexible conductive members 16a, 16b, and from this viewpoint, the thickness of the conductive connecting portions 15a, 15b should preferably be higher. The thickness of each of the conductive connecting portions 15a, 15b of 500 µm or less can suppress cracking or peeling due to a difference between thermal expansion coefficients of the pillar shaped honeycomb structure 11 and each of the metal electrodes 14a, 14b. Further, in order to increase the thickness of each of the conductive connecting portions 15a, 15b, the conductive connecting portions 15a, 15b are preferably made of a composite material of ceramics and a refractory metal. The thickness of each of the conductive connecting portions 15a, 15b is more preferably 1 to 500 µm, and even more preferably 5 to 100 µm.

Figure 5A:
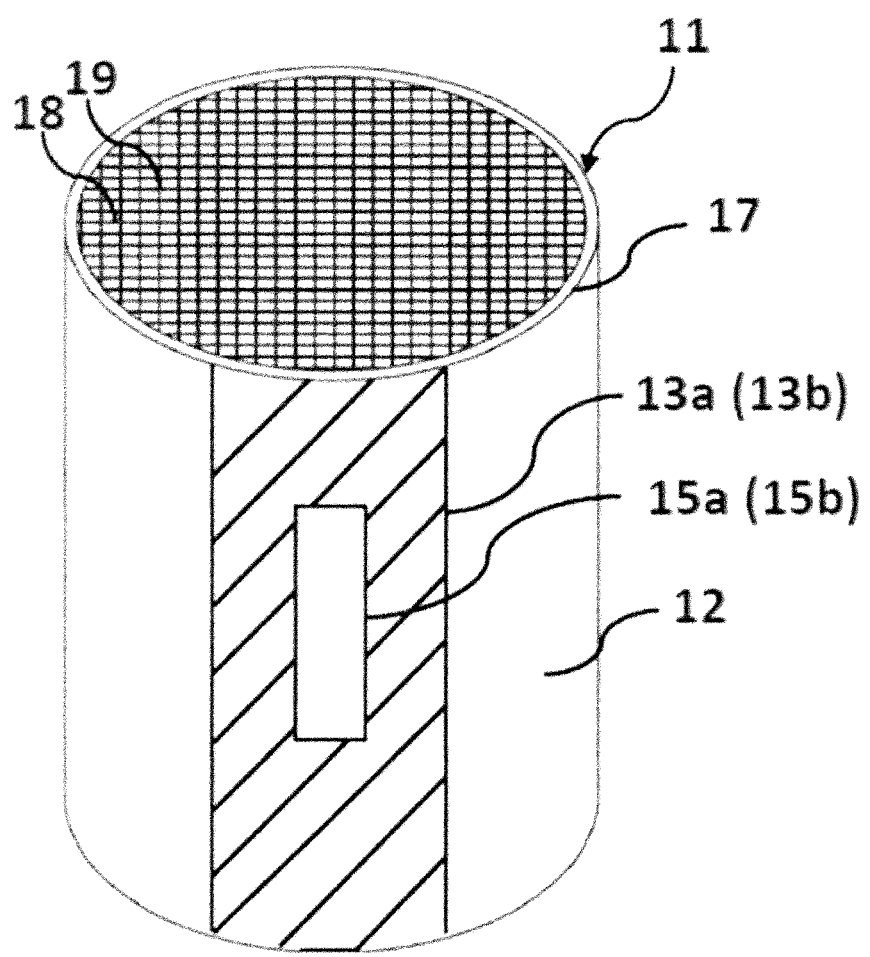
FIGS. 5A-5D are schematic external views for a pillar shaped honeycomb structure according to an embodiment of the present invention.
Figure 5B:
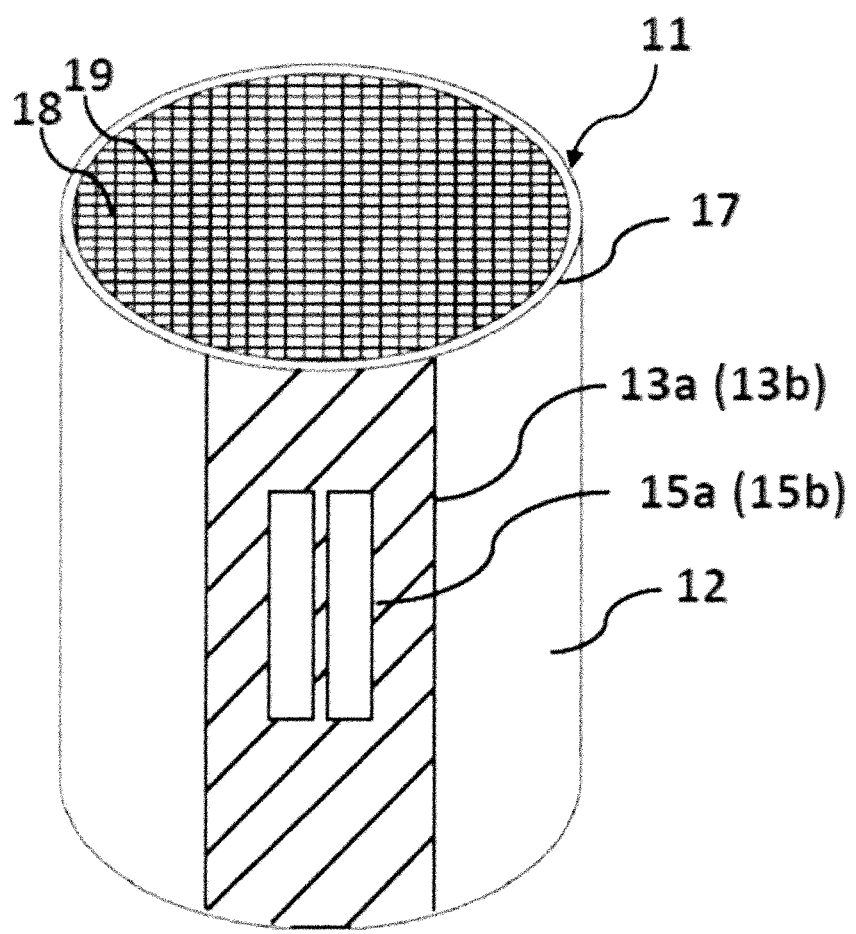
Figure 5C:
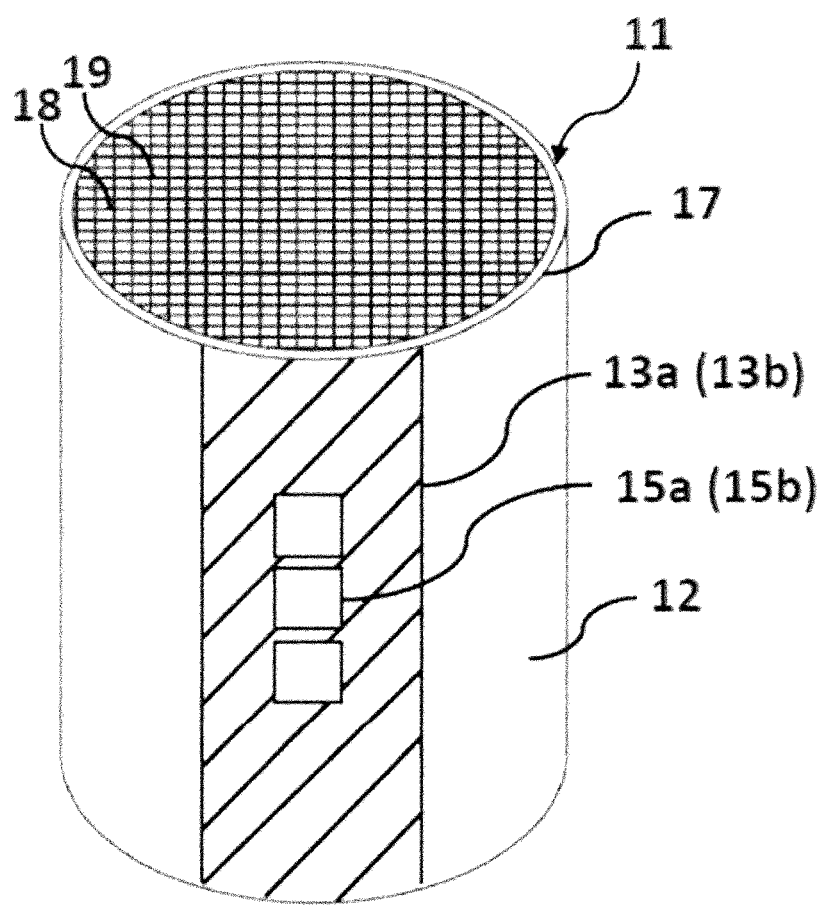
Figure 5D:
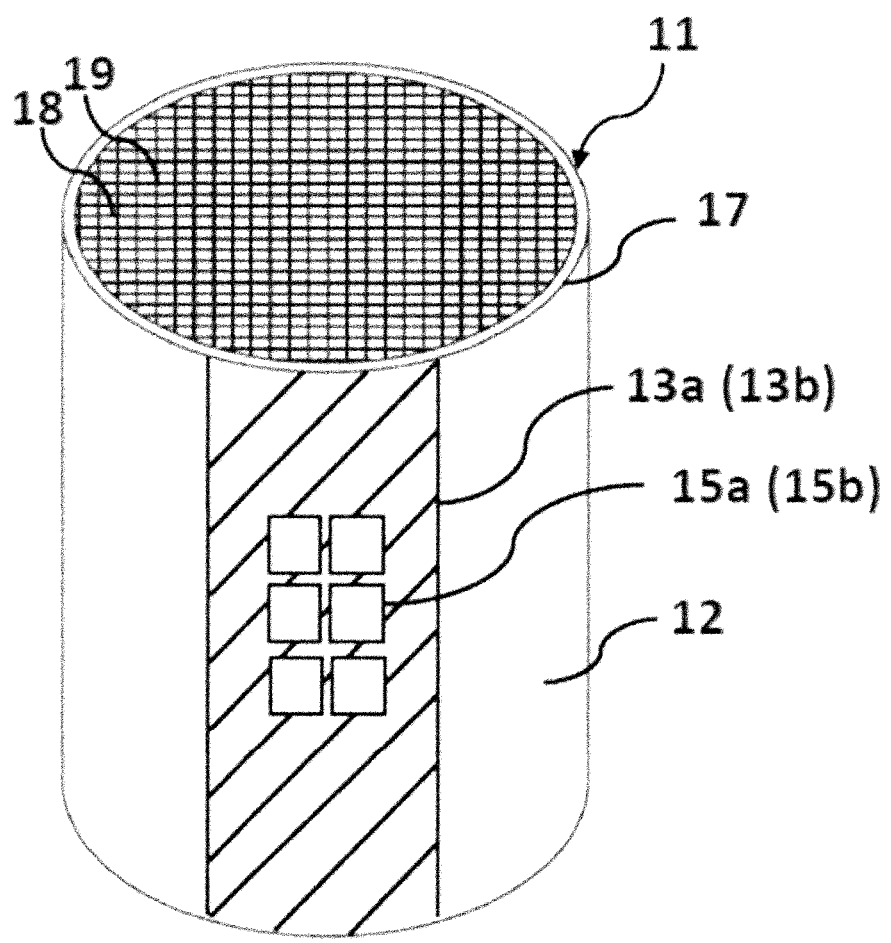

The shape of each of the conductive connecting portions 15a, 15b can be appropriately designed. For example, each of the conductive connecting portions 15a, 15b can be made in the form of layer. Further, each of the conductive connecting portions 15a, 15b can be formed into any shape such as a circular shape, an elliptical shape, and a polygonal shape, as viewed in a plane. The shape of each of the conductive connecting portions 15a, 15b is preferably circular or rectangular in terms of productivity and practicality. The area of each of the conductive connecting portions 15a, 15b is not particularly limited, and it may be appropriately designed depending on the current value to be passed through the pillar shaped honeycomb structure 11. Further, by increasing the area of each of the conductive connection portions 15a, 15b as compared with the contact area between each of the metal electrodes 14a, 14b and each of the conductive connection portions 15a, 15b, the current flowing from the metal electrodes 14a, 14b can be diffused in the conductive connection portions 15a, 15b, resulting in ease to heat the entire pillar shaped honeycomb structure 11 uniformly. When the area of each of the conductive connection portions 15a, 15b shown in FIG. 5A is larger, each of the conductive portions 15a, 15b is divided into at least two parts, as shown in FIGS. 5B to 5D. In the embodiment shown in FIG. 5B, each of the conductive connecting portions 15a, 15b is divided into the two parts in the outer peripheral direction of the pillar shaped honeycomb structure 11. In the embodiment shown in FIG. 5C, each of the conductive connecting portions 15a, 15b is divided into three parts in the extending direction of the cells 18 of the pillar shaped honeycomb structure 11. In the embodiment shown in FIG. 5D, each of the conductive connecting portions 15a, 15b is divided into six conductive connecting portions in total; the two parts in the outer peripheral direction of the pillar shaped honeycomb structure 11 and the three parts in the extending direction of the cells 18. As shown in FIGS. 5B to 5D, when each of the conductive connecting portions 15a, 15b is divided into at least two parts, the outer diameter or diagonal length of each of the conductive connecting portions 15a, 15b is preferably 5 to 50 mm, and more preferably 10 to 30 mm. The outer diameter or diagonal length of each of the conductive connecting portions 15a, 15b is preferably 50 mm or less, because it can preferably suppress cracking or peeling due to the difference between the thermal expansion coefficients of each of the conductive connecting portions 15a, 15b and the pillar shaped honeycomb structure 11. The outer diameter or diagonal length of each of the conductive connecting portions 15a, 15b is preferably 10 mm or more, because it can reduce the manufacturing costs.

(1-4. Metal Electrode)

The metal electrodes 14a, 14b are provided on the conductive connecting portions 15a, 15b, respectively. The metal electrodes 14a, 14b may be a pair of metal electrodes arranged such that one metal electrode 14a faces the other metal electrode 14b across the central axis of the pillar shaped honeycomb structure 11. As a voltage is applied to the metal electrodes 14a, 14b through the electrode layers 13a, 13b, a current can be conducted through the metal electrodes 14a, 14b to heat the pillar shaped honeycomb structure 11 by Joule heat. Therefore, the electrically heating converter 10 can be suitably used as a heater. The applied voltage is preferably from 12 to 900 V, and more preferably from 48 to 600 V, although the applied voltage may be varied as needed.

The material of the metal electrodes 14a, 14b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 14a, 14b are not particularly limited, and they can be appropriately designed according to the size of the pillar shaped honeycomb structure 11, the electrical conduction performance, and the like.

It is preferable that a heat resistant coating layer is provided on the surface of each of the metal electrodes 14a, 14b other than the surface in contact with each of the conductive connecting portions 15a, 15b. When the heat resistant coating layer is provided on the surface of each of the metal electrodes 14a, 14b, the metal electrodes 14a, 14b are difficult to deteriorate even if they are exposed to heat such as an exhaust gas for a long period of time. The heat resistant coating layer on each of the metal electrodes 14a, 14b can be formed by applying a coating containing alumina, silica, zirconia, silicon carbide or the like to the surface of each of the metal electrodes 14a, 14b. The coating of a metal oxide such as alumina, silica, or zirconia can impart insulating properties, so that it is possible to reduce electrical short circuits due to condensed water, soot, and the like.

As shown in FIG. 1, flexible conductive members 16a, 16b may be provided between the metal electrodes 14a, 14b and the conductive connecting portions 15a, 15b, respectively. Depending on the shape of each of the metal electrodes 14a, 14b, the shape does not match that of the outer peripheral surface of the pillar shaped honeycomb structure 11, so that the contact area with each of the conductive connecting portions 15a, 15b may be decreased. In this case, in order to obtain a good electrical connection it is necessary to press the metal electrodes 14a, 14b against the conductive connection portions 15a, 15b with a larger force. On the other hand, the providing of the flexible conductive members 16a, 16b between the metal electrodes 14a, 14b and the conductive connecting portions 15a, 15b can increase the contact area of each of the metal electrodes 14a, 14b with each of the conductive connecting portions 15a, 15b without increasing the pressing force of each of the metal electrodes 14a, 14b applied to each of the conductive connecting portions 15a, 15b. As a result, the contact electrical resistance between the pillar shaped honeycomb structure 11 and each of the metal electrodes 14a, 14b can be satisfactorily reduced regardless of the shape of each of the metal electrodes 14a, 14b. The flexible conductive members 16a, 16b may not be provided, and the metal electrodes 14a, 14b may be provided directly on the conductive connecting portions 15a, 15b, respectively.

Each of the flexible conductive members 16a, 16b preferably has a thickness of 10 to 5000 μm. The thickness of each of the flexible conductive members 16a, 16b of 10 μm or more can lead to relaxation so as to fill a gap due to a difference between the shapes of each of the metal electrodes 14a, 14b and each of the conductive connecting portions 15a, 15b, can ensure a larger contact area, and can further reduce the contact electrical resistance. The thickness of each of the flexible conductive members 16a, 16b of 5000 μm or less can prevent the resistance of each of the flexible conductive members 16a, 16b themselves from becoming too large, and can result in appropriate deformation of the flexible conductive members 16a, 16b by the pressing, so that a pressure on the contact surface with each of the conductive connecting portions 15a, 15b can further be improved. The thickness of each of the flexible conductive members 16a, 16b is more preferably 50 to 3000 μm, and even more preferably 100 to 2000 μm.

The flexible conductive members 16a, 16b may be made of any material as long as they have flexibility enough to fill the gap due to the difference between the shapes of each of the metal electrodes 14a, 14b and each of the conductive connecting portions 15a, 15b. The flexible conductive members 16a, 16b can be made of, for example, a mesh metal, a wire mesh, a metal plain knitted wire, or an expanded graphite sheet.

Instead of providing the flexible conductive members 16a, 16b between the metal electrodes 14a, 14b and the conductive connecting portions 15a, 15b, respectively, the metal electrodes 14a, 14b may be made of a flexible metal. Alternatively, the flexible conductive members 16a, 16b are provided between the metal electrodes 14a, 14b and the conductive connecting portions 15a, 15b, respectively, and the metal electrodes 14a, 14b may further be made of a flexible metal. By making the metal electrodes 14a, 14b of the flexible metal, it is possible to reduce the thermal stress generated between the metal electrodes 14a, 14b and the conductive connecting portions 15a, 15b. As a result, the contact electrical resistance between the pillar shaped honeycomb structure 11 and each of the metal electrodes 14a, 14b can be more satisfactorily reduced. Examples of the flexible metal making up the metal electrodes 14a, 14b include a mesh metal, a metal plain knitted wire, a bellows metal, a coil metal and the like.

(1-5. Antioxidant Material)

Between the pillar shaped honeycomb structure 11 and each of the metal electrodes 14a, 14b may be an antioxidant material. The antioxidant material may also be provided from the surface of the pillar shaped honeycomb structure 11 over the outer surface of each of the metal electrodes 14a, 14b. When the environment (exhaust gas) temperature is higher, the oxide film may be formed between the pillar shaped honeycomb structure 11 of the EHC and each of the metal electrodes 14a, 14b. However, according to such a structure, the antioxidant material is provided between the pillar shaped honeycomb structure 11 and each of the metal electrodes 14a, 14b, or from the surface of the pillar shaped honeycomb structure 11 over the outer surface of each of the metal electrodes 14a, 14b, so that the formation of the oxide film can be suppressed. Therefore, it is possible to provide good electrical connectivity between the pillar shaped honeycomb structure 11 of the EHC and each of the metal electrodes 14a, 14b.

The antioxidant material may be made of an oxygen absorber containing at least one selected from the group consisting of Al, Si, Cr, Ti and C, or a reducing agent mainly based on a zinc chloride-ammonium chloride-based material, an organic halogen-based material, or borax or boric acid-based material.

The shape of the antioxidant material can be appropriately designed. For example, the antioxidant material can be made in the form of layer. The antioxidant material can be formed into any shape such as a circular shape, an elliptical shape, and a polygonal shape as viewed in a plane. The shape of the antioxidant material is preferably circular or rectangular from the viewpoint of productivity and practicality. Further, the antioxidant material may have a sheet shape, for example, a graphite sheet.

The antioxidant material preferably has a thickness of 10 to 1000 µm. The thickness of the antioxidant material of 10 µm or more can satisfactorily suppress the formation of the oxide film between the pillar shaped honeycomb structure 11 and each of the metal electrodes 14a, 14b. The thickness of the antioxidant material of 1000 µm or less can impart softness. The thickness of the antioxidant material is more preferably 50 to 500 µm, and even more preferably 100 to 300 µm.

(1-6. Pressing Member)

The pressing member 23 is configured to press the metal electrodes 14a, 14b against the conductive connecting portions 15a, 15b, respectively, so that the metal electrodes 14a, 14b are electrically connected to the pillar shaped honeycomb structure 11. As shown in FIGS. 1 and 2, the pressing member 23 includes: a can body 22 fitted with the pillar shaped honeycomb structure 11 provided with the metal electrodes 14a, 14b; and a mat (holding material) 21 provided in a gap between the pillar shaped honeycomb structure 11 provided with the metal electrodes 14a, 14b and the can body 22. The fitting of the can body 22 with the pillar shaped honeycomb structure 11 provided with the metal electrodes 14a, 14b can lead to an action of the pressure applied by the metal electrodes 14a, 14b to press the conductive connecting portions 15a, 15b, thereby electrically connect the electrodes 14a, 14b to the pillar shaped honeycomb structure 11. The mat 21 can hold the pillar shaped honeycomb structure 11 provided with the metal electrodes 14a, 14b so as not to move in the can body 22. The mat 21 is preferably a flexible heat insulating member. As the can body 22, a metal cylindrical member or the like can be used. In the embodiment of the present invention, the can body 22 and the mat 21 form the pressing member 23.

By supporting the catalyst on the pillar shaped honeycomb structure 11, the pillar shaped honeycomb structure 11 can be used as a catalyst. For example, a fluid such as an exhaust gas from a motor vehicle can flow through the flow paths of the plurality of cells 18. Examples of the catalyst include noble metal catalysts or catalysts other than them. Illustrative examples of the noble metal catalysts include a three-way catalyst or oxidation catalyst obtained by supporting a noble metal such as platinum (Pt), palladium (Pd) and rhodium (Rh) on surfaces of pores of alumina and containing a co-catalyst such as ceria and zirconia, or a $NO_x$ storage reduction catalyst (LNT catalyst) containing an alkaline earth metal and platinum as storage components for nitrogen oxides ($NO_x$). Illustrative examples of a catalyst that does not use the noble metal include a $NO_x$ selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

2. Electrically Heating Support

An electrically heating support 20 according to an embodiment of the present invention includes: the pillar shaped honeycomb structure 11; and the conductive connecting portions 15a, 15b provided on the surface of the pillar shaped honeycomb structure 11. That is, in the electrically heating support 20, the metal electrodes 14a, 14b are provided on the conductive connecting portions 15a, 15b, respectively, and the pressing member 23 are further provided to form an electrically heating converter 10.

As shown in FIG. 2, the electrically heating converter 10 provided with the electrically heating support 20 can be used as an exhaust gas purifying device 30. In the exhaust gas purifying device 30, the electrically heating support 20 of the electrically heating converter 10 is arranged in the middle of an exhaust gas flow path for flowing an exhaust gas from an engine. The exhaust gas purifying device 30 includes a tapered inlet-side diameter-decreased portion 31 on the gas inflow side and a tapered outlet-side diameter-decreased portion 32 on the gas discharge side. Each of the metal electrodes 14a, 14b has a shape that is stretched toward the gas discharge side, and is electrically connected to a wiring 25 connected to an external power supply via an insulating member 26 on the tapered outlet-side diameter-decreased portion 32.

3. Method for Producing Electrically Heating Converter

A method for producing the electrically heating converter 10 according to the present invention will now be illustratively described. In an embodiment, the method for producing the electrically heating converter 10 according to the present invention includes: a step A1 of obtaining an unfired honeycomb structure portion with an electrode layer forming paste; a step A2 of firing the unfired honeycomb structure portion with the electrode layer forming paste to form a pillar shaped honeycomb structure; a step A3 of forming the conductive connecting portions on the pillar shaped honeycomb structure; and a step A4 of providing the pillar shaped honeycomb structure with the metal electrodes and canning it into the can body.

The step A1 is to prepare a honeycomb formed body that is a precursor of the honeycomb structure portion, and apply an electrode layer forming paste to a side surface of the honeycomb formed body to obtain an unfired honeycomb structure portion with the electrode layer forming paste. The preparation of the honeycomb formed body can be carried out in accordance with a method for preparing a honeycomb formed body in a known method for producing a honeycomb structure portion. For example, first, a forming material is prepared by adding metal silicon powder (metal silicon), a binder, a surfactant, a pore former, water, and the like to silicon carbide powder (silicon carbide). It is preferable that a mass of metal silicon is from 10 to 40% by mass relative to the total of mass of silicon carbide powder and mass of metal silicon. The average particle diameter of the silicon carbide particles in the silicon carbide powder is preferably from 3 to 50 μm, and more preferably from 3 to 40 μm. The average particle diameter of the metal silicon (the metal silicon powder) is preferably from 2 to 35 μm. The average particle diameter of each of the silicon carbide particles and the metal silicon (metal silicon particles) refers to an arithmetic average diameter on volume basis when frequency distribution of the particle size is measured by the laser diffraction method. The silicon carbide particles are fine particles of silicon carbide forming the silicon carbide powder, and the metal silicon particles are fine particles of metal silicon forming the metal silicon powder. It should be noted that this is formulation for forming raw materials in the case where the material of the honeycomb structure portion is the silicon-silicon carbide composite material. In the case where the material of the honeycomb structure portion is silicon carbide, no metal silicon is added.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metal silicon powder is 100 parts by mass.

The content of water is preferably from 20 to 60 parts by mass when the total mass of the silicon carbide powder and the metal silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metal silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metal silicon powder is 100 parts by mass. An average particle diameter of the pore former is preferably from 10 to 30 μm. If the average particle diameter is less than 10 μm, pores may not be sufficiently formed. If the average particle diameter is more than 30 μm, a die may be clogged during forming. The average particle diameter of the pore former refers to an arithmetic average diameter on volume basis when frequency distribution of the particle size is measured by the laser diffraction method. When the pore former is the water absorbing resin, the average particle diameter of the pore former is an average particle diameter after water absorption.

Then, the resulting forming raw materials are kneaded to form a green body, and the green body is then extruded to prepare a honeycomb formed body. In extrusion molding, a die having a desired overall shape, cell shape, partition wall thickness, cell density and the like can be used. Preferably, the resulting honeycomb formed body is then dried. When the length in the central axis direction of the honeycomb formed body is not the desired length, both the end faces of the honeycomb formed body can be cut to the desired length. The honeycomb formed body after drying is referred to as a honeycomb dried body.

The electrode layer forming paste for forming electrode layers is then prepared. The electrode layer forming paste can be formed by appropriately adding and kneading various additives to raw material powder (metal powder, ceramic powder, and the like) formulated according to required characteristics of the electrode layers. When each electrode layer is formed into a laminated structure, the contact resistance can be decreased by increasing an average particle diameter of the metal powder in the past for the second electrode layer as compared with an average particle diameter of the metal powder in the paste for the first electrode layer, or by increasing an amount of metal powder added. The average particle diameter of the metal powder refers to an arithmetic average diameter on volume basis when frequency distribution of the particle diameter is measured by the laser diffraction method.

The resulting electrode layer forming paste is applied to the side surface of the honeycomb formed body (typically, the honeycomb dried body) to obtain an unfired honeycomb structure portion with an electrode layer forming paste. The method for preparing the electrode layer forming paste and the method for applying the electrode layer forming paste to the honeycomb formed body can be performed according to a known method for producing a honeycomb structure. However, in order to achieve lower electrical resistivity of the electrode layer than the honeycomb structure portion, it is possible to increase a metal content ratio or to decrease the particle diameter of the metal particles as compared with the honeycomb structure portion.

As a variation of the method for producing the pillar shaped honeycomb structure, in the step A1, the honeycomb formed body may be temporarily fired before applying the electrode layer forming paste. That is, in this variation, the honeycomb formed body is fired to produce a honeycomb fired body, and the electrode fired paste is applied to the honeycomb fired body.

In the step A2, the unfired honeycomb structure portion with the electrode layer forming paste is fired to obtain a pillar shaped honeycomb structure. Prior to firing, the unfired honeycomb structure with the electrode layer forming paste may be dried. Also, prior to firing, degreasing may be carried out to remove the binder and the like. As the firing conditions, the unfired honeycomb structure is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

In the step A3, the conductive connecting portions are formed by thermal spray coating in order to form the conductive connecting portions on the surfaces of the electrode layers on the pillar shaped honeycomb structure. A method of forming the conductive connecting portions by thermal spraying starts with application of masking such as metal sheets and glass tapes to regions of the electrode layers on the pillar shaped honeycomb structure where the conductive connecting portions are not formed. Subsequently, at least a part of the surfaces of the electrode layers are preheated, and a predetermined material is thermally sprayed by a predetermined number of passes under predetermined spraying conditions to obtain a sprayed coating having a desired thickness. Further, the conductive connecting portions may be formed so as to have a predetermined arrangement and shape by a conventional method such as cold spraying, plating, a CVD method, a PVD method, an ion plating method, an aerosol deposition method, and coating by printing of the conductive material. Further, the flexible conductive member may be formed by arranging a mesh-like metal, a wire mesh, a metal plain knitted wire, an expanded graphite sheet, or the like on the conductive connecting portions.

The method of thermally spraying the conductive connecting portions onto the surfaces of the electrode layers on the pillar shaped honeycomb structure is not particularly limited, and a known thermal spraying method may be used. When thermally spraying a raw material for forming the conductive connecting portions, a shield gas such as argon may be simultaneously allowed to flow for the purpose of suppressing the oxidation of the raw material. Further, a method of coating the surfaces of the electrode layers on the pillar shaped honeycomb structure with the raw material for the conductive connecting portions includes a method of forming a paste of the raw material for the conductive connecting portions and directly applying the paste by a brush or various printing methods. The firing after coating may preferably be carried out under firing conditions of heating in an inert atmosphere such as argon at 1100 to 1500° C. for 1 to 20 hours. The temperature of the firing conditions as used herein refers to a temperature in the firing atmosphere.

In the step A4, the metal electrodes are provided on the conductive connecting portions. In this case, non-bonding physical joining such as simply placing the metal electrodes on the conductive connecting portions are carried out, rather than chemical bonding such as welding, brazing, and diffusion bonding. Subsequently, the metal electrodes are pressed against the conductive connecting portions by canning into the can body provided with the mat on the inner side while providing the metal electrodes on the conductive connecting portions, thereby electrically connecting the metal electrodes to the pillar shaped honeycomb structure. The electrically heating converter can be thus obtained.

EXAMPLES

Hereinafter, Examples is illustrated for better understanding of the present invention and its advantages, but the present invention is not limited to these Examples.

Example 1

(1. Production of Cylindrical Green Body)

Silicon carbide (SiC) powder and metal silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a cylindrical green body. The content of the binder was 7 parts by mass when the total of the silicon carbide (SIC) powder and the metal silicon (Si) powder was 100 parts by mass. The content of the pore former was 3 parts by mass when the total of the silicon carbide (SiC) powder and the metal silicon (Si) powder was 100 parts by mass. The content of water was 42 parts by mass when the total of the silicon carbide (SiC) powder and the metal silicon (Si) powder was 100 parts by mass. The average particle diameter of the silicon carbide powder was 20 µm, and the average particle diameter of the metal silicon powder was 6 µm. The average particle diameter of the pore former was 20 µm. The average particle diameter of each of the silicon carbide powder, the metal silicon powder and the pore former refers to an arithmetic mean diameter on volume basis, when measuring frequency distribution of the particle size by the laser diffraction method.

(2. Production of Honeycomb Dried Body)

The resulting cylindrical green body was formed using an extruder having a grid pattern-like die structure to obtain a cylindrical honeycomb formed body in which each cell had a square shape in a cross section perpendicular to the flow path direction of the cells. The honeycomb formed body was subjected to high-frequency dielectric heating and drying and then dried at 120° C. for 2 hours using a hot air drier, and a predetermined amount of both end faces were cut to prepare a honeycomb dried body.

(3. Preparation of Electrode Layer Forming Paste)

Metal silicon (Si) powder, silicon carbide (SiC) powder, methyl cellulose, glycerin, and water were mixed with a planetary centrifugal mixer to prepare an electrode layer forming paste. The Si powder and the SiC powder were mixed in a volume ratio of Si powder:SiC powder=40:60. Further, when the total of Si powder and SiC powder was 100 parts by mass, methyl cellulose was 0.5 parts by mass, glycerin was 10 parts by mass, and water was 38 parts by mass. The average particle diameter of the metal silicon powder was 6 µm. The average particle diameter of the silicon carbide powder was 35 µm. Each of these average particle diameters refers to an arithmetic mean diameter on volume basis when a frequency distribution of particle diameters is measured by the laser diffraction method.

(4. Applying and Firing of Electrode Layer Forming Paste)

The electrode layer forming paste was then applied to the honeycomb dried body so as to have an appropriate area and a film thickness by means of a curved surface printing machine, and further dried in a hot air dryer at 120° C. for 30 minutes, and then fired together with the honeycomb dried body in an Ar atmosphere at 1400° C. for 3 hours to obtain a pillar shaped honeycomb structure.

(5. Application of Thermal Spray Coating for Forming Conductive Connecting Portions)

The raw material for forming the conductive connecting portions was thermally sprayed by plasma spraying at two positions facing each other across the central axis of the pillar shaped honeycomb structure on the surfaces of the electrode layers on the pillar shaped honeycomb structure to form the conductive connecting portions. The raw material for forming the conductive connecting portions was NiCrAlY, and plasma spraying was carried out under the following thermal spraying conditions. As the plasma gas, an Ar—$H_2$ mixed gas composed of 60 L/min Ar gas and 10 L/min $H_2$ gas was used. A plasma current was 600 A, a plasma voltage was 60 V, a thermal spraying distance was 150 mm, and an amount of thermal spraying particles fed was 30 g/min. Furthermore, the plasma frame was shielded with an Ar gas in order to suppress the oxidation of the metal during the thermal spraying.

The pillar shaped honeycomb structure had circular end faces each having a diameter of 118 mm, and a height (a length in the flow path direction of the cells) of 75 mm. The cell density was 93 cells/$cm^2$, the thickness of the partition wall was 101.6 µm, the porosity of the partition wall was 45%, and the average pore diameter of the partition wall was 8.6 μm. The thickness of each electrode layer was 0.3 mm, and the thickness of each conducting connecting portion was 0.05 mm. The electrical resistivity at 400° C. was measured by a four-terminal method using samples having the same materials as those of the electrode layers and the conducting connecting portions, indicating that it was 0.1 Ωcm, and 3.0×10³ μΩcm (0.003 Ωcm), respectively.

(6. Arrangement of Electrodes)

A sample was prepared by arranging metal electrodes made of SUS having a thickness of 400 μm on the conductive connection portions at the two positions of the honeycomb structure. In this case, the metal electrodes were physically joined only by being placed on the conductive connecting portions, and chemical bonding such as welding, brazing, and diffusion bonding was not carried out.

Example 2

A sample was prepared by the same method as that of Example 1, with the exception that the mesh member made of Inconel 601 having a thickness of 1 mm was provided between each of the conductive connecting portions and each of the metal electrodes as the flexible conductive member.

Example 3

A sample was prepared by the same method as that of Example 1, with the exception that the conductive connecting portions were prepared by using CrB—Si as the raw material for forming the conductive connecting portions.

Example 4

The conductive connecting portions were produced by using CrB—Si as the raw material for forming the conductive connecting portions. Further, the mesh member made of SUS304 having a thickness of 2 mm was provided between each of the conductive connecting portions and each of the metal electrodes as the flexible conductive member. Except for these, a sample was prepared by the same method as that of Example 1.

Example 5

A sample was prepared by the same method as that of Example 1, with the exception that the conductive connecting portions were prepared by using Cu as the raw material for forming the conductive connecting portions.

Example 6

The conductive connecting portions was prepared by using Cu as the raw material for forming the conductive connecting portions. Further, the mesh member made of SUS304 having a thickness of 2 mm was provided between each of the conductive connecting portions and each of the metal electrodes as the flexible conductive member. Except for these, a sample was prepared by the same method as that of Example 1.

Comparative Example 1

A sample was prepared by the same method as that of Example 1, with the exception that the metal electrodes were directly provided on the electrode layers without providing the conductive connecting portions.

Comparative Example 2

A sample was prepared by the same method as that of Example 2, with the exception that the conductive connecting portions were not provided.

(7. Electrical Resistance Evaluation Test, Variation Evaluation)

In each of the samples of Examples 1 to 6 and Comparative Examples 1 and 2, the electric resistance between the two metal electrodes provided so as to face each other across the central axis of the honeycomb structure was evaluated. The electrical resistance was measured using a digital multimeter (GDM-8261A, from TEXIO TECHNOLOGY CORPORATION), and the resistance value was determined by averaging values of n=5 measured in the 4-wire resistance measurement mode. Further, a difference (Max−Min) between the maximum value and the minimum value of the resistance between the electrodes obtained at n=5 was calculated as a variation.

The evaluation results are shown in Table 1. In Table 1 below, "A" and "B" of the evaluation results indicate that the effect of the present invention is obtained, and "C" indicates that the effect of the present invention is not obtained.

TABLE 1

| | Honeycomb Structure (Porous Body) | | | | Conductive Connecting Portions | | Flexible Conductive Member | Metal Electrodes | Resistance Between Electrodes | | |
|---|---|---|---|---|---|---|---|---|---|---|---|
| | Diameter | Length | Substrate | Porosity | Material | | Material | Thickness | n = 5 Average | Variation | Evaluation |
| Unit | mm | mm | Material | % | Material | μΩcm | Material | mm | Ω | Max−Min | Results |
| Example 1 | 118 | 75 | Si—SiC | 45 | NiCrAlY | 2 × 10³ | No Member | 0.4 | 1.9 | 0.6 | B |
| Example 2 | 118 | 75 | Si—SiC | 45 | NiCrAlY | 2 × 10³ | Inconel 601 | 0.4 | 0.99 | 0.06 | A |
| Example 3 | 118 | 75 | Si—SiC | 45 | CrB—Si | 1 × 10⁴ | No Member | 0.4 | 2.0 | 0.8 | B |
| Example 4 | 118 | 75 | Si—SiC | 45 | CrB—Si | 1 × 10⁴ | SUS304 | 0.4 | 1.1 | 0.1 | A |
| Example 5 | 118 | 75 | Si—SiC | 45 | Cu | <1 × 10³ | No Member | 0.4 | 1.8 | 0.5 | B |
| Example 6 | 118 | 75 | Si—SiC | 45 | Cu | <1 × 10³ | SUS304 | 0.4 | 0.96 | 0.05 | A |
| Comp. 1 | 118 | 75 | Si—SiC | 45 | No Coating | — | No Member | 0.4 | 13.5 | 4.8 | C |
| Comp. 2 | 118 | 75 | Si—SiC | 45 | No Coating | — | Inconel 601 | 0.4 | 3.8 | 0.8 | C |

(8. Discussion)

In each of Examples 1 to 6, the electric resistance between the two metal electrodes can be sufficiently reduced to 2Ω or less due to the effect of the conductive connecting portions. In particular, in each of Examples 2, 4 and 6, the electric resistance between the two metal electrodes could be 0.96 to 1.1Ω, and the contact resistance between each of the metal electrodes and the honeycomb structure could be sufficiently reduced by the effect of the flexible conductive member.

Further, the variation in the resistance between the electrodes can also be reduced in Examples 1 to 6. This would be due to the effect of reducing the variation in the contact pressure. The variation in measurement of the resistance between the electrodes is expected to be caused by a slight variation in the pressure for pressing the metal electrodes, but in Examples 2, 4 and 6, the conductive connecting portion and the flexible conductive member can sufficiently reduce the contact resistance even by a lower pressure. As a result, it is considered that the variation in the resistance between the electrodes could be reduced.

On the other hand, in each of Comparative Examples 1 and 2 having no conductive connecting portion, the resistance between the electrodes is 3Ω or more. It can be expected that the contact resistance between each of the metal electrodes and the honeycomb structure is clearly higher than that of the honeycomb structure.

DESCRIPTION OF REFERENCE NUMERALS 10 electrically heating converter
11 pillar shaped honeycomb structure
12 outer peripheral wall
13a, 13b electrode layer
14a, 14b metal electrode
15a, 15b conductive connecting portion
16a, 16b flexible conductive member
17 pillar shaped honeycomb portion
18 cell
19 partition wall
20 electrically heating support
21 mat (pressing member)
22 can body (pressing member)
23 pressing member
25 wiring
26 insulating member
30 exhaust gas purifying device
31 inlet-side diameter-decreased portion
32 outlet-side diameter-decreased portion

The invention claimed is:

1. An electrically heating converter, comprising:
a pillar shaped honeycomb structure made of conductive ceramics, comprising: an outer peripheral wall; and a partition wall disposed on an inner side of the outer peripheral wall, the partition wall defining a plurality of cells, each of the cells penetrating from one end face to other end face to form a flow path;
metal electrodes;
conductive connecting portions arranged on a surface of the pillar shaped honeycomb structure; and
a pressing member configured to press the metal electrodes against the conductive connecting portions, so that the metal electrodes are electrically connected to the pillar shaped honeycomb structure,
wherein each of the conductive connecting portions has an electrical resistivity lower than that of the pillar shaped honeycomb structure.

2. The electrically heating converter according to claim 1, wherein the conductive connecting portions are made of a material comprising one or more selected from the group consisting of Ni, Cr, Al and Si.

3. The electrically heating converter according to claim 2, wherein the conductive connecting portions are made of a material of CrB—Si, LaB$_6$—Si, TaSi$_2$, NiCr, NiCrAlY, or NiCrFe.

4. The electrically heating converter according to claim 1, wherein the conductive connecting portions are made of a material having an electric resistivity of $1.5 \times 10^0$ to $1.5 \times 10^4$ μΩcm.

5. The electrically heating converter according to claim 1, wherein a material exhibiting semiconductor characteristics as the material of the conductive connecting portions has a content of 80% by volume or less.

6. The electrically heating converter according to claim 5, wherein the material exhibiting the semiconductor characteristics is at least one selected from the group consisting of Si, Ge, ZnS, ZnSe, CdS, ZnO, CdTe, GaAs, InP, GaN, GaP, SiC, SiGe, and CuInSe$_2$.

7. The electrically heating converter according to claim 1 wherein the conductive ceramics contains at least one selected from silicon and silicon carbide.

8. The electrically heating converter according to claim 1, wherein the pillar shaped honeycomb structure comprises:
a pillar shaped honeycomb portion made of conductive ceramics, the pillar shaped honeycomb portion having the outer peripheral wall and the partition wall; and
electrode layers made of conductive ceramics, the electrode layers being provided on the outer peripheral wall,
wherein the conductive connecting portions are provided on the electrode layers, respectively.

9. The electrically heating converter according to claim 8, wherein the electrode layers are a pair of electrode layers arranged so as to face each other across a central axis of the pillar shaped honeycomb portion on a surface of the outer peripheral wall of the pillar shaped honeycomb portion.

10. The electrically heating converter according to claim 1, wherein each of the conductive connecting portions has a thickness of 0.1 to 500 μm.

11. The electrically heating converter according to claim 1, wherein each of the conductive connecting portions is divided into at least two parts.

12. The electrically heating converter according to claim 1, wherein the metal electrodes are made of a flexible metal.

13. The electrically heating converter according to claim 1, wherein a flexible conductive member is provided between each of the conductive connecting portions and each of the metal electrodes.

14. The electrically heating converter according to claim 13, wherein the flexible conductive member has a thickness of 10 to 5000 μm.

15. The electrically heating converter according to claim 13, wherein the flexible conductive member is made of a mesh-like metal, a wire mesh, a metal plain knitted wire, or an expanded graphite sheet.

16. The electrically heating converter according to claim 1, wherein the pressing member comprises:
a can body configured to fit the pillar shaped honeycomb structure provided with the metal electrodes; and
a holding material provided in a gap between the can body and the pillar shaped honeycomb structure provided with the metal electrodes.

* * * * *